(12) United States Patent
Wu et al.

(10) Patent No.: US 9,794,050 B2
(45) Date of Patent: Oct. 17, 2017

(54) DEVICES CONFIGURED WITH JOINTLY AGGREGATED TDD AND FDD COMPONENT CARRIERS

(71) Applicant: HTC Corporation, Taoyuan County (TW)

(72) Inventors: Chih-Yao Wu, Taoyuan County (TW); Chih-Hsiang Wu, Taoyuan County (TW)

(73) Assignee: HTC Corporation, Taoyuan (TW)

(*) Notice: Subject to any disclaimer, the term of this patent is extended or adjusted under 35 U.S.C. 154(b) by 239 days.

(21) Appl. No.: 14/320,662

(22) Filed: Jul. 1, 2014

(65) Prior Publication Data

US 2015/0003304 A1    Jan. 1, 2015

Related U.S. Application Data

(60) Provisional application No. 61/841,435, filed on Jul. 1, 2013, provisional application No. 61/877,268, filed on Sep. 12, 2013.

(51) Int. Cl.
    *H04J 4/00*             (2006.01)
    *H04L 5/14*             (2006.01)
    (Continued)

(52) U.S. Cl.
CPC .............. *H04L 5/14* (2013.01); *H04L 1/0077* (2013.01); *H04L 1/1854* (2013.01); *H04L 5/001* (2013.01); *H04L 5/0055* (2013.01); *H04W 28/04* (2013.01)

(58) Field of Classification Search
CPC .................................................... H04W 28/04
See application file for complete search history.

(56) References Cited

U.S. PATENT DOCUMENTS

2010/0322173 A1* 12/2010 Marinier ............. H04W 76/048
                                                           370/329
2011/0096701 A1* 4/2011 Lin ................................ 370/280
(Continued)

FOREIGN PATENT DOCUMENTS

EP           2557878 A1     2/2013
WO      2012070839 A2     5/2012

OTHER PUBLICATIONS

3GPP TS 36.213 V11.2.0, Feb. 2013.
(Continued)

*Primary Examiner* — Omar Ghowrwal
*Assistant Examiner* — Angel Brockman
(74) *Attorney, Agent, or Firm* — Winston Hsu

(57) ABSTRACT

A method of assigning PUCCH transmission timing for a mobile device configured with jointly aggregated TDD and FDD CCs includes determining a UL transmission timing in a first subframe for a corresponding feedback in response to a first DL transmission in a second subframe on a first cell, where the second subframe is k subframes prior to the first subframe; and transmitting the corresponding feedback of the first DL transmission in the first subframe on a second cell according to the first UL transmission timing of the first DL transmission of the first cell; where the first cell is on a TDD CC and the first cell has no PUCCH to transmit the corresponding feedback of the first DL transmission, and the second cell is on an FDD CC and the second cell uses PUCCH to transmit the corresponding feedback of the first DL transmission of the first cell.

17 Claims, 8 Drawing Sheets

(51) Int. Cl.
*H04L 1/18* (2006.01)
*H04L 5/00* (2006.01)
*H04L 1/00* (2006.01)
*H04W 28/04* (2009.01)

(56) References Cited

U.S. PATENT DOCUMENTS

2011/0310830 A1* 12/2011 Wu et al. ............... 370/329
2013/0039231 A1*  2/2013 Wang .................... 370/280
2013/0077542 A1   3/2013 Yang
2013/0176981 A1*  7/2013 Earnshaw et al. ..... 370/329
2013/0208692 A1*  8/2013 Seo et al. ............... 370/329

OTHER PUBLICATIONS

3GPP TS 36.321 V11.3.0, Jun. 2013.
3GPP TS 36.331 V11.4.0, Jun. 2013.
3GPP TS 36.300 V11.6.0, Jun. 2013.
European Search report issued on Oct. 30, 2014 for EP application No. 14175264.2, filed Jul. 1, 2014.
Yong Li et al., "Control Channel Design for Carrier Aggregation between LTE FDD and LTE TDD Systems", Vehicular Technology Conference (VTC Spring), 2012 IEEE 75th, IEEE, May 6, 2012 (May 6, 2012), pp. 1-5, XP032202278.
3GPP TS 36.213 V11.3.0 (Jun. 2013), "3rd Generation Partnership Project; Technical Specification Group Radio Access Network; Evolved Universal Terrestrial Radio Access (E-UTRA); Physical layer procedures (Release 11)", XP050692859, pp. 1-176.
Office action dated Jan. 11, 2017 for the China application No. 201410326563.X, filing date Jul. 1, 2014, p. 1-9.

* cited by examiner

DEVICES CONFIGURED WITH JOINTLY AGGREGATED TDD AND FDD COMPONENT CARRIERS

CROSS REFERENCE TO RELATED APPLICATIONS

This application claims the benefit of U.S. Provisional Application No. 61/841,435, filed on Jul. 1, 2013 and entitled "Method and Apparatus for Physical Layer Uplink Control Channel Transmission Timing under Joint TDD-FDD Operation Wireless Communication Systems", and U.S. Provisional Application No. 61/877,268, filed on Sep. 12, 2013 and entitled "Method and Apparatus for handling HARQ RTT timer in FDD and TDD carrier aggregation", the contents of which are incorporated herein in their entirety.

BACKGROUND OF THE INVENTION

1. Field of the Invention

The present invention relates to a method used in a wireless communication system and related communication device, and more particularly, to a method of data transmission timing control and discontinuous reception handling under joint Time Division Duplex (TDD) and Frequency Division Duplex (FDD) operation and related communication device.

2. Description of the Prior Art

Owing to mobile communication technology advancements in recent years, various communication services, such as voice call services, data transfer services, and video call services, etc., may be provided to users regardless of their locations. Most mobile communication systems are multiple access systems in which access and wireless network resources are allocated to multiple users. The multiple access technologies employed by the mobile communication systems include the 1× Code Division Multiple Access 2000 (1×CDMA 2000) technology, the 1× Evolution-Data Optimized (1×EVDO) technology, the Orthogonal Frequency Division Multiplexing (OFDM) technology, and the Long Term Evolution (LTE) technology. Evolved from the LTE technology, the LTE Advanced is a major enhancement of the LTE standard. The LTE Advanced should be compatible with LTE equipment, and should share frequency bands with the LTE communication system. One of the important LTE Advanced benefits is its ability to take advantage of advanced topology networks, wherein optimized heterogeneous networks have a mix of macros with low power nodes such as picocells, femtocells and new relay nodes.

In addition, carrier aggregation (CA) is supported in an LTE Advanced system to leverage unused or vacant resources for enhanced throughput performance. It essentially aggregates multiple component carriers (CC) at a user equipment (UE) so that multiple component carriers can be transmitted simultaneously. The CA can be applied to aggregate both contiguous and non-contiguous CCs. The network may configure the UE to aggregate a different number of CCs originating from a single evolved NodeB (eNB) or from different eNBs. In such a situation, the UE can simultaneously receive radio frequency (RF) signals via multiple CCs with single or multiple receivers and simultaneously transmit RF signals via multiple CCs with single or multiple transmitters. A record of configured set of CCs aggregated for signal and data transmission may be maintained by both the UE and the eNB for keeping information regarding the configured CCs for the UE.

In the 3GPP Rel-10 specification, the aggregated component carriers should operate under the same duplexing mode. In other words, they should all belong to either time division duplex (TDD) CC or frequency division duplex (FDD) CC. This limitation reduces effort on the design of the whole CA mechanism. Yet, in practical wireless systems there is a need for leveraging unused or vacant component carriers which share different duplexing mode to the current used component carriers. However, if FDD and TDD component carriers are aggregated jointly, the physical uplink control channel (PUCCH), e.g. hybrid automatic repeat request (HARQ) acknowledgement (ACK) or negative-acknowledgement (NACK), feedback timing should be redesigned from legacy systems because FDD does not fall into any TDD configurations.

In the prior art, the PUCCH is transmitted on a primary cell (a PCell, or a primary carrier) while a downlink transmission (e.g. PDSCH transmission) may happen on the primary carrier or secondary cells (SCells, or secondary carriers). The associated feedback of the downlink transmission in a serving cell (which may be the primary cell or other carriers in CA) cannot be fed back on the primary cell by directly following the serving cell feedback timing. Otherwise, the UE might be forced to have PUCCH transmission within a downlink subframe on the primary cell and cause severe interference or system errors. In some cases, the UE may be forced to drop the PUCCH.

Moreover, when an FDD CC and a TDD CC are aggregated to transmit to the UE, it is not clear in the prior art how long a HARQ round trip time (RTT) Timer should be set by the UE. Inappropriate setting of the HARQ RTT Timer could cause certain issues to the communication system or increase the system delay time. For example, when a PCell of the UE is on the TDD CC, the UE may need to transmit HARQ feedbacks (ACK or NACK) on a PUCCH to the PCell for reception of downlink data on an FDD CC. In this case, 8 milliseconds may not be long enough for the HARQ RTT timer of the downlink HARQ process for reception of data on the FDD CC, so the UE may not monitor the PDCCH for a retransmission corresponding to the downlink HARQ process after the HARQ RTT timer and drx-RetransmissionTimer expire. Therefore, the UE cannot receive a retransmission if the retransmission is transmitted after the HARQ RTT timer and drx-RetransmissionTimer expire. On the other hand, setting the HARQ RTT timer to a longer value would cause the receiver of the UE to keep awake unnecessarily. In such a situation, the UE does not switch its receiver to a sleep mode, which therefore wastes the battery power of the UE.

Therefore, how to handle data transmission and enhance operation of discontinuous reception (DRX) under joint TDD-FDD operation in a wireless communication system is an important topic to be addressed and discussed.

SUMMARY OF THE INVENTION

An objective of the present invention is to provide a method to handle data transmission timing and enhance operation of discontinuous reception in Frequency Division Duplex (FDD) and Time Division Duplex (TDD) carrier aggregation in a wireless communication system.

The present invention discloses a communication device for assigning transmission timing of Physical Uplink Control Channel (PUCCH) configured with jointly aggregated Time Division Duplex (TDD) and Frequency Division Duplex (FDD) component carriers. The communication device includes a processing means; and a storage unit, coupled to the processing means, for storing a program code, wherein the program code instructs the processing means to execute the following steps: receiving a first downlink (DL) transmission on a first cell; determining a first uplink (UL) transmission timing in a first subframe for a corresponding feedback in response to the first DL transmission in a second subframe on the first cell, where the second subframe is k subframes prior to the first subframe; and transmitting the corresponding feedback of the first DL transmission in the first subframe on a second cell according to the first UL transmission timing of the first DL transmission of the first cell; wherein the first cell is on a TDD component carrier and the first cell has no PUCCH to transmit the corresponding feedback of the first DL transmission; and wherein the second cell is on an FDD component carrier and the second cell uses PUCCH to transmit the corresponding feedback of the first DL transmission of the first cell.

The present invention further discloses a communication device for assigning transmission timing of Physical Uplink Control Channel (PUCCH) configured with jointly aggregated Time Division Duplex (TDD) and Frequency Division Duplex (FDD) component carriers. The communication device includes a processing means; and a storage unit, coupled to the processing means, for storing a program code, wherein the program code instructs the processing means to execute the following steps: receiving a first downlink (DL) transmission on a first cell; determining a first uplink (UL) transmission timing of the first cell by associating a UL subframe on a second cell with at least one DL subframe on the first cell, wherein every DL subframe on the first cell is associated to one UL subframe on the second cell, and wherein the at least one DL subframe is k subframes prior to the UL subframe; and transmitting a corresponding feedback of the first DL transmission in the associated UL subframe on the second cell; wherein the first cell is on an FDD component carrier and the first cell has no PUCCH to transmit the corresponding feedback of the DL transmission; and wherein the second cell is on a TDD component carrier and the second cell uses PUCCH to transmit the corresponding feedback of the DL transmission of the first cell.

The present invention further discloses a communication device configured with jointly aggregated Time Division Duplex (TDD) and Frequency Division Duplex (FDD) component carriers. The communication device includes a processing means; and a storage unit, coupled to the processing means, for storing a program code, wherein the program code instructs the processing means to execute the following steps: receiving a first downlink (DL) data from an first component carrier (CC); and setting a first round trip time (RTT) Timer to a period for reception of retransmission on the first CC when the communication device is configured with a first Physical Uplink Control Channel (PUCCH) on a second CC for transmitting an acknowledge (ACK) or a negative-acknowledge (NACK) feedback for the first DL data; if the first CC is an FDD CC and the second CC is a TDD CC, the period equals to 4+k subframes, wherein k is an interval between a DL transmission of the first DL data and a transmission of the ACK or NACK feedback for the first DL data; if the first CC is a TDD CC and the second CC is an FDD CC, the period equals to 8 subframes.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
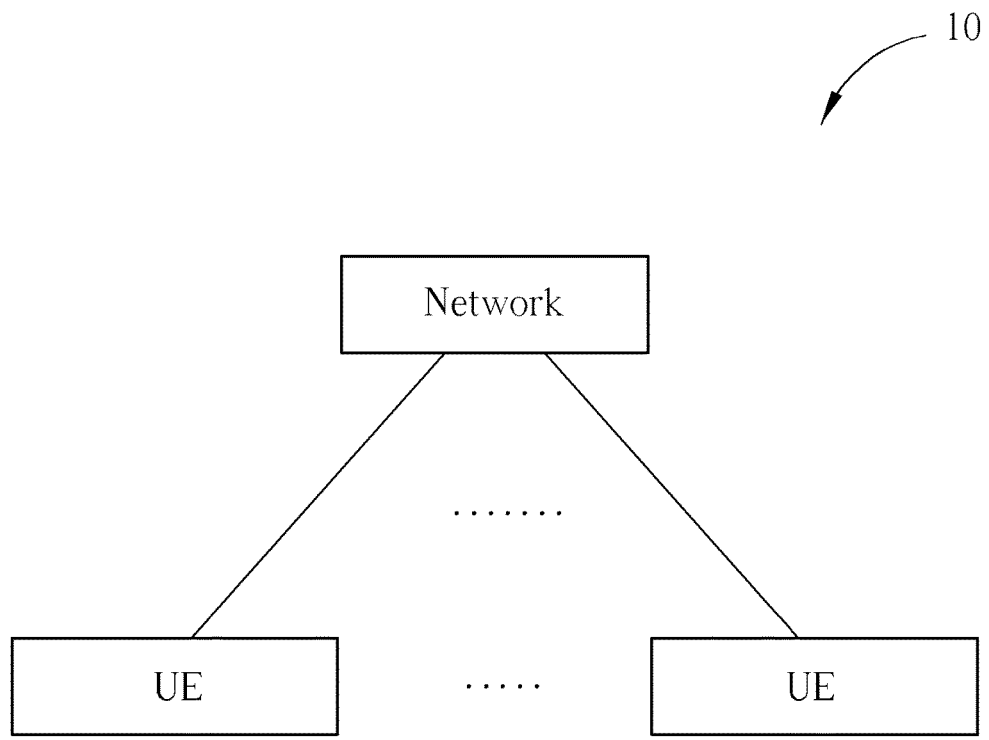
FIG. 1 is a schematic diagram of a wireless communication system according to an example of the present invention.

Please refer to FIG. 1, which is a schematic diagram of a wireless communication system 10 according to an example of the present invention. The wireless communication system 10 is briefly composed of a network and a plurality of user equipments (UEs). In FIG. 1, the network and the communication devices are simply utilized for illustrating the structure of the wireless communication system 10. Practically, the network can be a universal terrestrial radio access network (UTRAN) comprising a plurality of Node-Bs (NBs) in a universal mobile telecommunications system (UMTS). Alternatively, the network can be an evolved UTRAN (E-UTRAN) comprising a plurality of evolved NBs (eNBs) and/or relays in a long term evolution (LTE) system or a LTE-Advanced (LTE-A) system. The UEs can be mobile devices such as mobile phones, laptops, tablet computers, electronic books, and portable computer systems. Besides, the network and the UE can be regarded as a transmitter or receiver depending on the transmission direction, e.g., for an uplink (UL), the UE is the transmitter and the network is the receiver, and for a downlink (DL), the network is the transmitter and the UE is the receiver.

Furthermore, the network can also include both the UTRAN/E-UTRAN and a core network, wherein the core network includes network entities such as Mobility Management Entity (MME), Serving Gateway (S-GW), Packet Data Network (PDN) Gateway (P-GW), Self-Organizing Networks (SON) server and/or Radio Network Controller (RNC), etc. In other words, after the network receives information transmitted by a communication device, the information may be processed only by the UTRAN/E-UTRAN and decisions corresponding to the information are made at the UTRAN/E-UTRAN. Alternatively, the UTRAN/E-UTRAN may forward the information to the core network, and the decisions corresponding to the information are made at the core network after the core network processes the information. Besides, the information can be processed by both the UTRAN/E-UTRAN and the core network, and the decisions are made after coordination and/or cooperation are performed by the UTRAN/E-UTRAN and the core network.

Figure 2:
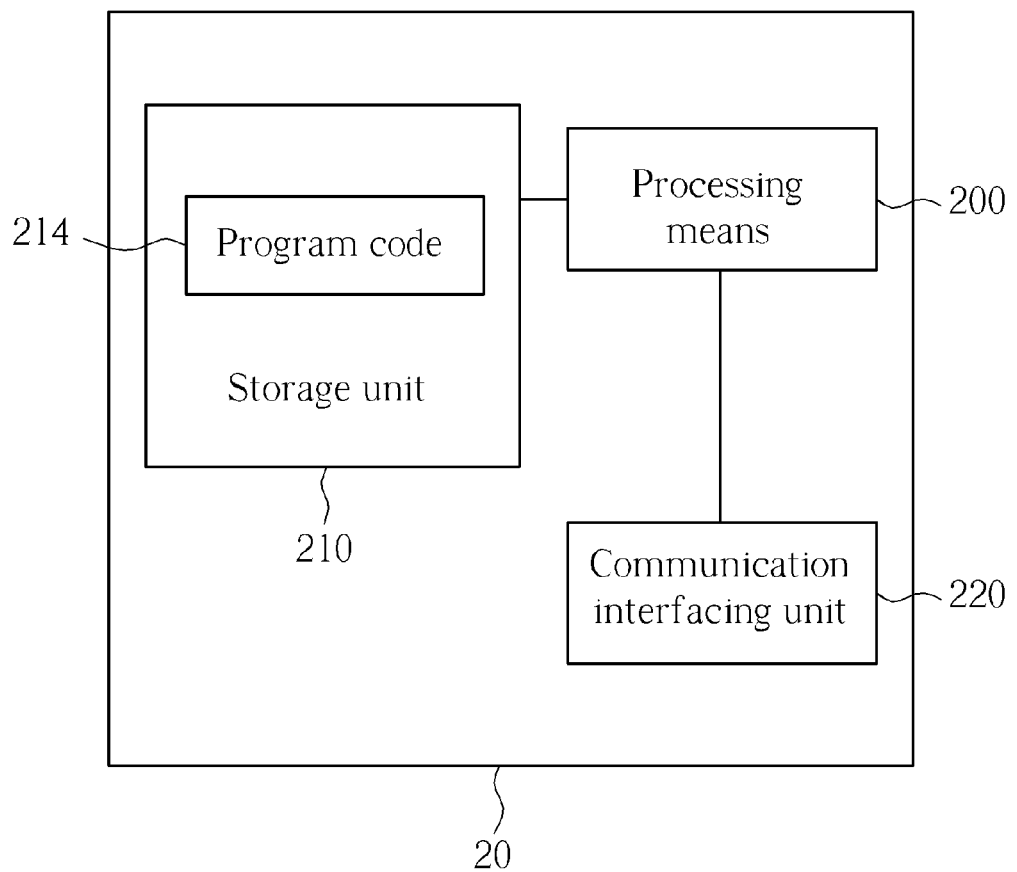
FIG. 2 is a schematic diagram of a communication device according to an example of the present invention.

Please refer to FIG. 2, which is a schematic diagram of a communication device 20 according to an example of the present invention. The communication device 20 can be a communication device or the network shown in FIG. 1, but is not limited herein. The communication device 20 may include a processing means 200 such as a microprocessor or Application Specific Integrated Circuit (ASIC), a storage unit 210 and a communication interfacing unit 220. The processing means 200 may be a DSP processor, a baseband processor, and/or a cellular modem. The storage unit 210 may be any data storage device that can store a program code 214, accessed and executed by the processing means 200. Examples of the storage unit 210 include but are not limited to a subscriber identity module (SIM), read-only memory (ROM), flash memory, random-access memory (RAM), CD-ROM/DVD-ROM, magnetic tape, hard disk and optical data storage device. The communication interfacing unit 220 is preferably a transceiver and is used to transmit and receive signals (e.g., messages or packets) according to processing results of the processing means 200.

Figure 3:
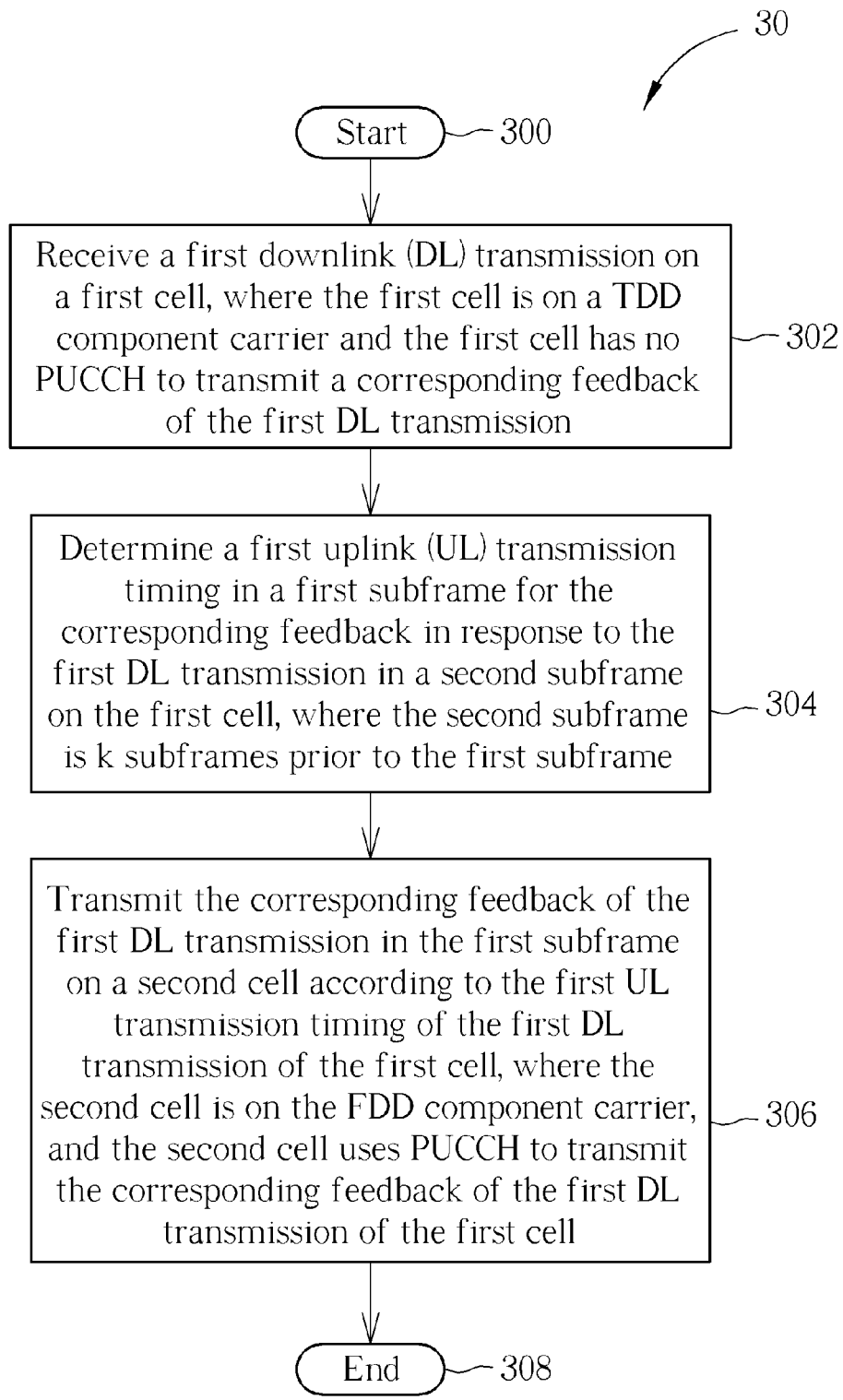
FIG. 3 is a flowchart of a process according to an example of the present invention.

Please refer to FIG. 3, which is a flowchart of a process 30 according to an example of the present invention. The process 30 is utilized for assigning transmission timing of Physical Uplink Control Channel (PUCCH) on an FDD component carrier for a mobile device configured with jointly aggregated TDD and FDD component carriers (CCs). The mobile device may be the UE in the wireless communication system 10, but is not limited herein. The process 30 may be implemented by the communication device 20 and compiled into the program code 214 to instruct the processing means 200 to execute the following steps:

Step 300: Start.

Step 302: Receive a first downlink (DL) transmission on a first cell, where the first cell is on a TDD component carrier and the first cell has no PUCCH to transmit a corresponding feedback of the first DL transmission.

Step 304: Determine a first uplink (UL) transmission timing in a first subframe for the corresponding feedback in response to the first DL transmission in a second subframe on the first cell, where the second subframe is k subframes prior to the first subframe.

Step 306: Transmit the corresponding feedback of the first DL transmission in the first subframe on a second cell according to the first UL transmission timing of the first DL transmission of the first cell, where the second cell is on the FDD component carrier, and the second cell uses PUCCH to transmit the corresponding feedback of the first DL transmission of the first cell.

Step 308: End.

According to the process 30, the mobile device is configured with at least an FDD CC and a TDD CC aggregated to transmit to the mobile device. The mobile device may receive a DL transmission (e.g., Physical Downlink Shared Channel) in subframe n on a first cell (e.g. secondary cell SC1), and transmit a corresponding feedback (e.g., a PUCCH transmission of a HARQ ACK, NACK, or the like) on a second cell (e.g. primary cell PC1). In an example, the primary cell PC1 is on an FDD component carrier and the secondary cell SC1 is on a TDD component carrier. After detection of the PDSCH transmission on the TDD secondary cell SC1 within subframe n−k, the corresponding PUCCH transmission happens in subframe n on the FDD primary cell PC1.

The index k may be constant over all subframe numbers. In an example, k may be equal to 4. That is, a PUCCH transmission happens in subframe n on the FDD primary cell PC1 after detection of a PDSCH transmission on the TDD secondary cell SC1 within subframe n−4. In this case, the PUCCH transmission timing of the TDD secondary cell SC1 is the same as the feedback timing of a legacy FDD component carrier, where there is no joint operation/aggregation of FDD and TDD component carriers at the mobile device. This example can reduce the retransmission latency even when the serving cell is on a TDD component carrier.

Alternatively, the index k may belong to a downlink association set K depending on the subframe number of the first subframe and the UL-DL configuration of the secondary cell SC1. An example of the downlink association set K is defined in TABLE I. In this case, the PUCCH transmission timing of the TDD secondary cell SC1 is the same as the feedback timing of a legacy TDD component carrier, where there is no joint operation/aggregation of FDD and TDD component carriers at the mobile device.

TABLE I

Downlink association set K: {k0, k1, ... k$_{M-1}$} for TDD serving cell to FDD primary cell

| Serving Cell UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Figure 4:
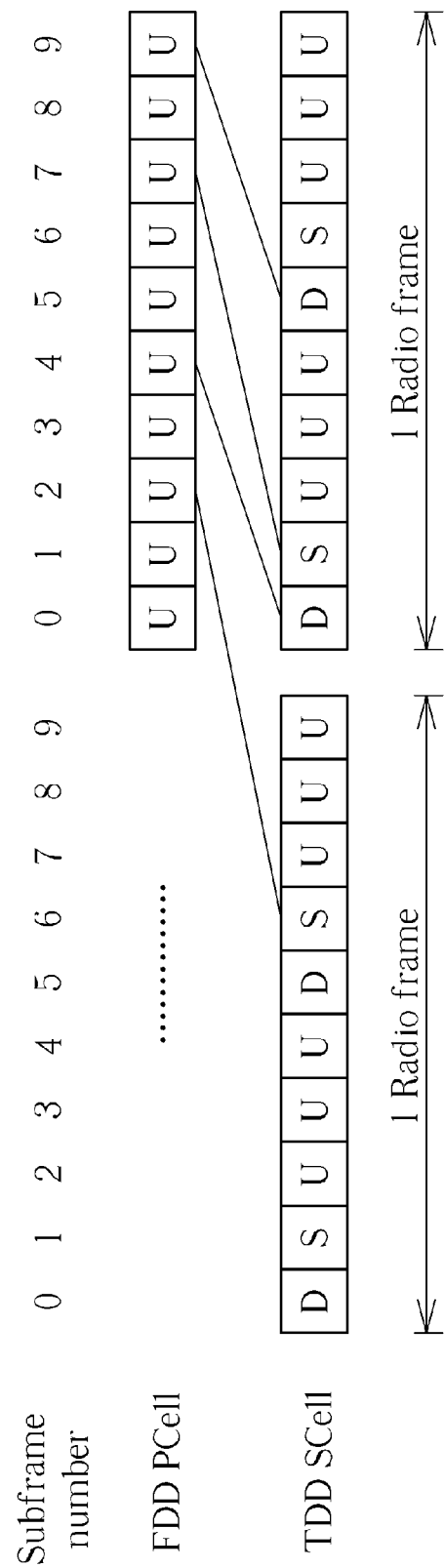
FIG. 4 shows timelines of downlink association for uplink feedback transmission on an FDD CC according to an example of the present invention.

As an example, when the mobile device is configured with an FDD primary cell which is jointly aggregated with a TDD secondary cell having UL-DL configuration 0, the mobile device assigns a UL transmission timing of the TDD secondary cell such that a corresponding PUCCH transmission happens within subframe 2 on the FDD primary cell if the mobile device detects that there is a PDSCH transmission on the TDD secondary cell in subframe 2-6 (i.e., subframe 6 of the previous radio frame), a corresponding PUCCH transmission happens within subframe 4 on the FDD primary cell if the mobile device detects that there is a PDSCH transmission on the TDD secondary cell in subframe 4-4 (i.e., subframe 0), a corresponding PUCCH transmission happens within subframe 7 on the FDD primary cell if the mobile device detects that there is a PDSCH transmission on the TDD secondary cell in subframe 7-6 (i.e., subframe 1), and a corresponding PUCCH transmission happens within subframe 9 on the FDD primary cell if the mobile device detects that there is a PDSCH transmission on the TDD secondary cell in subframe 9-4 (i.e., subframe 5). The timelines of the downlink association for this example is illustrated in FIG. 4.

In some examples, another secondary cell SC2 may be configured to jointly aggregate with the primary cell PC1 and the secondary cell SC1 at the mobile device. When the secondary cell SC2 is on an FDD component carrier, the PUCCH timing of the secondary cell SC2 may be assigned to be the same as the PUCCH timing of the secondary cell SC1.

When the secondary cell SC2 is on a TDD component carrier, the PUCCH timing of the secondary cell SC2 may also be assigned in the same manner as the PUCCH timing of the secondary cell SC1 assigned for the mobile device. If the secondary cell SC2 has the same TDD UL-DL configuration as the secondary cell SC1, the PUCCH timing of the secondary cell SC2 and the PUCCH timing of the secondary cell SC1 may be the same, but they are independently assigned by the mobile device. If the secondary cell SC2 has different TDD UL-DL configuration from the secondary cell SC1, the PUCCH timing of the secondary cell SC2 may be assigned independently, irrespective of the PUCCH timing of the secondary cell SC1. In other words, the index k is k1 for the secondary cell SC1 and the index k is k2 for the secondary cell SC2, where k1 and k2 have no correlation to each other. In an example, k1 may be a constant over all subframe numbers while k2 may belong to the downlink association set K defined in TABLE I. In another example, k1 and k2 may both belong to the downlink association K defined in TABLE I, where the PUCCH timing of the secondary cell SC1 and the PUCCH timing of the secondary cell SC2 depend on their own UL-DL configurations, respectively.

Alternatively, the secondary cell SC1 and the secondary cell SC2 may use a reference TDD configuration which depends on a combination of their own TDD configurations, and their PUCCH timing follows the PUCCH feedback timing of the reference TDD configuration. More specifically, when the mobile device is configured with two TDD secondary cells, a reference TDD configuration may be determined according to the combination of TDD configurations of the secondary cell SC1 and the secondary cell SC2. The reference TDD configuration may be determined based on the conditions and TABLE II as follows.

If the pair formed by (first secondary cell TDD configuration, second secondary cell TDD configuration) belongs to Set 1 in TABLE II, or if the mobile device is not configured to monitor Physical Downlink Control Channel (PDCCH) or Enhanced Physical Downlink Control Channel (EPDCCH) in another serving cell for scheduling the serving cell, and if the pair formed by (first secondary cell TDD configuration, second secondary cell TDD configuration) belongs to Set 2 or Set 3 in TABLE II, or if the mobile device is configured to monitor PDCCH/EPDCCH in another serving cell for scheduling the serving cell, and if the pair formed by (first secondary cell TDD configuration, second secondary cell TDD configuration) belongs to Set 4 or Set 5 in TABLE II, then the reference TDD configuration for the secondary cell SC1 and the secondary cell SC2 is defined in the corresponding Set in TABLE II.

TABLE II

| Set # | (First secondary cell TDD configuration, second secondary cell TDD configuration) | reference TDD configuration |
|---|---|---|
| Set 1 | (0, 0) | 0 |
|  | (1, 0), (1, 1), (1, 6) | 1 |
|  | (2, 0), (2, 2), (2, 1), (2, 6) | 2 |
|  | (3, 0), (3, 3), (3, 6) | 3 |
|  | (4, 0), (4, 1), (4, 3), (4, 4), (4, 6) | 4 |
|  | (5, 0), (5, 1), (5, 2), (5, 3), (5, 4), (5, 5), (5, 6) | 5 |
|  | (6, 0), (6, 6) | 6 |
| Set 2 | (0, 1), (6, 1) | 1 |
|  | (0, 2), (1, 2), (6, 2) | 2 |
|  | (0, 3), (6, 3) | 3 |
|  | (0, 4), (1, 4), (3, 4), (6, 4) | 4 |
|  | (0, 5), (1, 5), (2, 5), (3, 5), (4, 5), (6, 5) | 5 |
|  | (0, 6) | 6 |
| Set 3 | (3, 1), (1, 3) | 4 |
|  | (3, 2), (4, 2), (2, 3), (2, 4) | 5 |
| Set 4 | (0, 1), (0, 2), (0, 3), (0, 4), (0, 5), (0, 6) | 0 |
|  | (1, 2), (1, 4), (1, 5) | 1 |
|  | (2, 5) | 2 |
|  | (3, 4), (3, 5) | 3 |
|  | (4, 5) | 4 |
|  | (6, 1), (6, 2), (6, 3), (6, 4), (6, 5) | 6 |
| Set 5 | (1, 3) | 1 |
|  | (2, 3), (2, 4) | 2 |
|  | (3, 1), (3, 2) | 3 |
|  | (4, 2) | 4 |

The process 30 is an example of the present invention. Those skilled in the art should readily make combinations, modifications and/or alterations on the abovementioned description and examples. In addition, the corresponding feedback may be a Hybrid Automatic Repeat Request (HARQ) feedback corresponding to the DL transmission in the second subframe in a DL HARQ process. The HARQ feedback may be a HARQ acknowledgement (ACK), a HARQ negative-acknowledgement (NACK), or any other messages in response to the DL transmission from the secondary cell.

Figure 5:
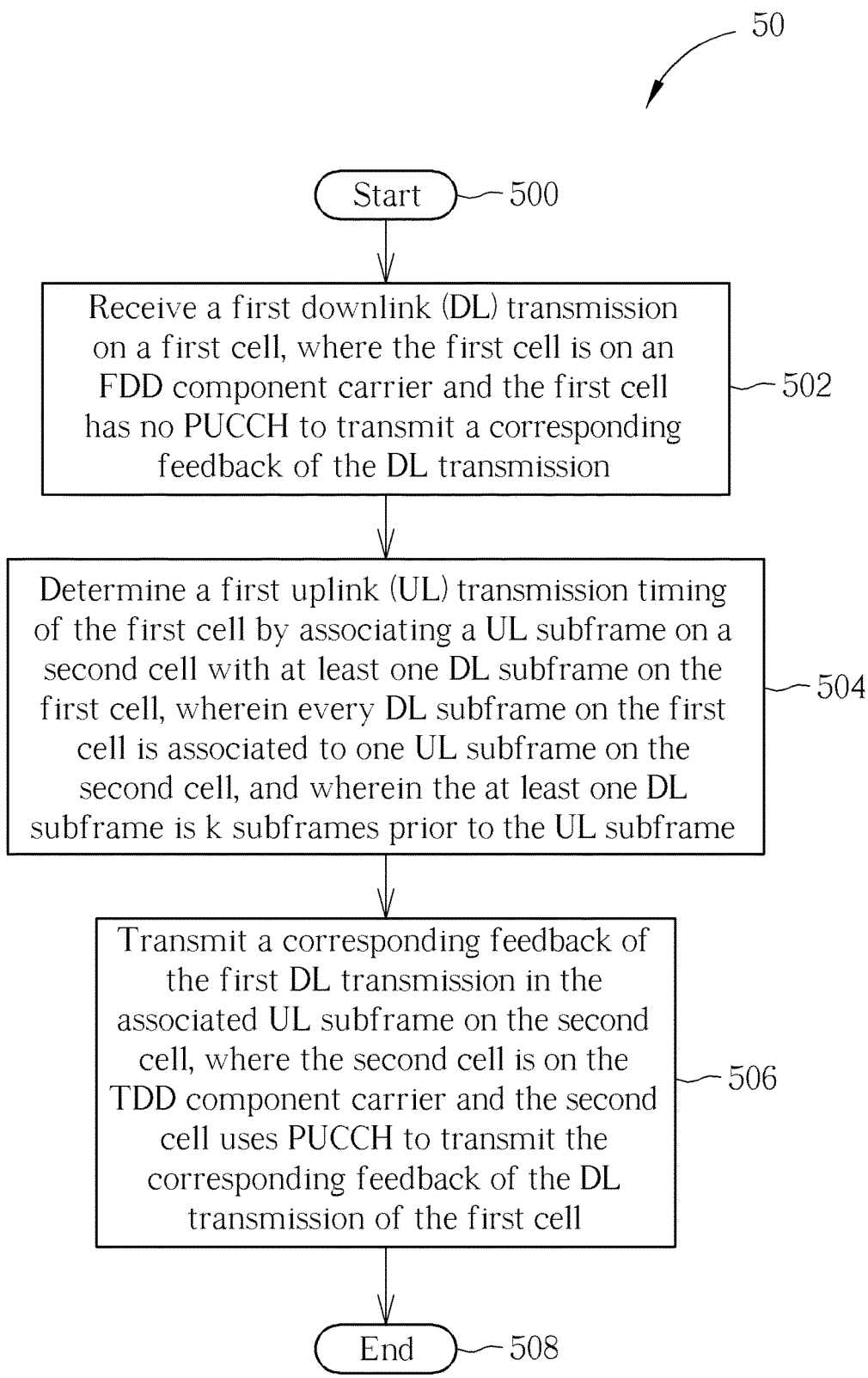
FIG. 5 is a flowchart of a process according to an example of the present invention.

Please refer to FIG. 5, which is a flowchart of a process 50 according to an example of the present invention. The process 50 is utilized for assigning transmission timing of Physical Uplink Control Channel (PUCCH) on a TDD component carrier for a mobile device configured with jointly aggregated TDD and FDD component carriers (CCs). The mobile device may be the UE in the wireless communication system 10, but is not limited herein. The process 30 may be implemented by the communication device 20 and compiled into the program code 214 to instruct the processing means 200 to execute the following steps:

Step 500: Start.

Step 502: Receive a first downlink (DL) transmission on a first cell, where the first cell is on an FDD component carrier and the first cell has no PUCCH to transmit a corresponding feedback of the DL transmission.

Step 504: Determine a first uplink (UL) transmission timing of the first cell by associating a UL subframe on a second cell with at least one DL subframe on the first cell, wherein every DL subframe on the first cell is associated to one UL subframe on the second cell, and wherein the at least one DL subframe is k subframes prior to the UL subframe.

Step 506: Transmit a corresponding feedback of the first DL transmission in the associated UL subframe on the second cell, where the second cell is on the TDD component carrier and the second cell uses PUCCH to transmit the corresponding feedback of the DL transmission of the first cell.

Step 508: End.

According to the process 50, the mobile device is configured with at least an FDD CC and a TDD CC aggregated to transmit to the mobile device. The mobile device may receive a DL transmission (e.g., Physical Downlink Shared Channel) in subframe n on a first cell (e.g., secondary cell SC3), and transmit a corresponding feedback (e.g., a PUCCH transmission of a HARQ ACK, NACK, or the like) on a second cell (e.g., primary cell PC2) In an example, the primary cell PC2 is on a TDD component carrier and the secondary cell SC3 is on an FDD component carrier. In this case, the PUCCH transmission timing cannot follow the feedback timing of a legacy FDD component carrier since not all of the subframes on the primary cell PC2 are uplink subframes. Also, the PUCCH transmission timing cannot follow the feedback timing of a legacy TDD component carrier with the same configuration as the primary cell PC1. Therefore, in an aspect of the present invention downlink association is made for DL subframes on the secondary cell SC3 to the UL subframes on the TDD primary cell PC2.

DL subframes on the FDD secondary cell SC3 may be associated to the closest UL subframe on the TDD primary cell PC2, where there are at least 4 subframes between the UL subframe and the associated DL subframe. In an example, the index k belongs to a downlink association set K2 depending on the subframe number of the UL subframe and the UL-DL configuration of the TDD primary cell PC2. The downlink association set K2 for FDD serving cell to TDD primary cell may be extended from the downlink association set K for TDD serving cell where more indices are added to make downlink association for all DL subframes on the secondary cell SC3. The indices {k0, k1, . . . , $k_{M-1}$} in the downlink association set K2 are designed to fall in a range which is the same as the indices in the downlink association set K for TDD serving cell. That is, k falls between 4 and 6 if the TDD primary cell is configured with UL-DL Configuration 0, k falls between 4 and 7 if the TDD primary cell is configured with UL-DL Configuration 1, k falls between 4 and 8 if the TDD primary cell is configured with UL-DL Configuration 2, k falls between 4 and 11 if the TDD primary cell is configured with UL-DL Configuration 3, k falls between 4 and 12 if the TDD primary cell is configured with UL-DL Configuration 4, k falls between 4 and 13 if the TDD primary cell is configured with UL-DL Configuration 5, and k falls between 4 and 7 if the TDD primary cell is configured with UL-DL Configuration 6. An exemplary downlink association set K2 is defined in TABLE III.

TABLE III

Downlink association set K2: {k0, k1, . . . $k_{M-1}$} for FDD serving cell to TDD primary cell

| Primary Cell UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6, 5, 4 | 4 | 4 | — | — | 6, 5, 4 | 4 | 4 |
| 1 | — | — | 7, 6, 5, 4 | 4 | — | — | — | 7, 6, 5, 4 | 4 | — |
| 2 | — | — | 8, 7, 4, 6, 5 | — | — | — | — | 8, 7, 4, 6, 5 | — | — |
| 3 | — | — | 7, 6, 11, 10, 9, 8 | 6, 5 | 5, 4 | — | — | — | — | — |
| 4 | — | — | 12, 8, 7, 11, 10, 9 | 6, 5, 4, 7 | — | — | — | — | — | — |
| 5 | — | — | 13, 12, 9, 8, 7, 5, 4, 11, 6, 10 | — | — | — | — | — | — | — |
| 6 | — | — | 7, 5, 4 | 7 | 5 | — | — | 7, 5, 4 | 7, 4 | — |

Figure 6:
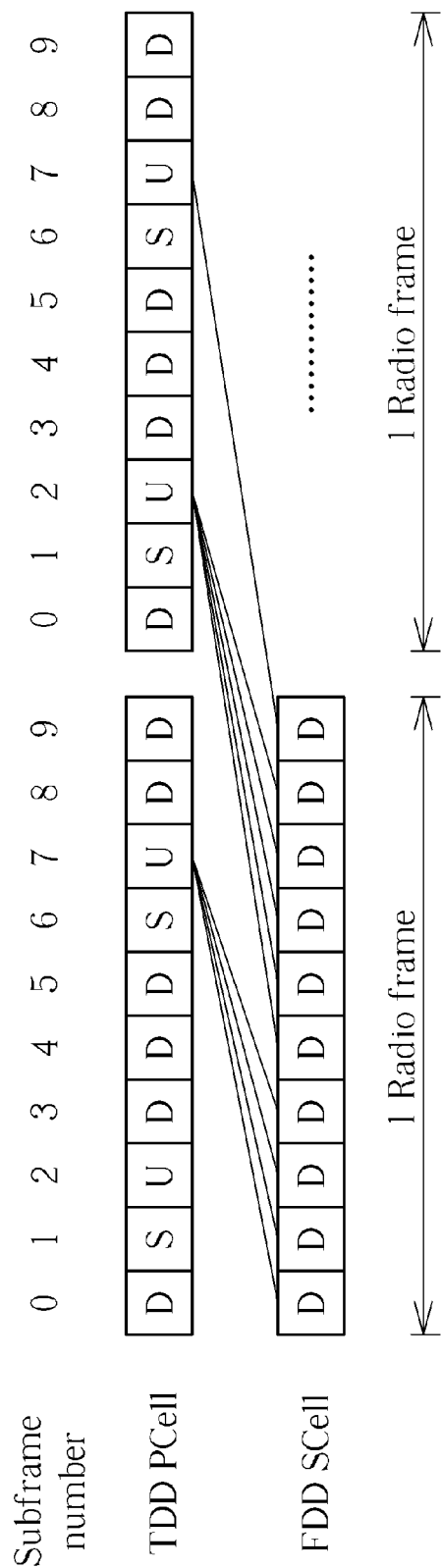
FIG. 6 shows timelines of downlink association for uplink feedback transmission on a TDD CC according to an example of the present invention.

As an example, when the mobile device is configured with a TDD primary cell with UL-DL configuration 2 which jointly aggregates an FDD secondary cell, mobile device associates DL subframes on the FDD serving cell to UL subframes on the TDD primary cell as the association shown in FIG. 6.

Note that TABLE III is an example of the present invention. Those skilled in the art should readily make combinations, modifications and/or alterations on the abovementioned description and examples. For example, for better PUCCH efficiency (e.g. better HARQ-ACK bundling or multiplexing efficiency), the indices in certain subframes may be relocated to make the number of indices in the downlink association set K2 for each UL subframe more balanced.

In some examples, another secondary cell SC4 may be configured to jointly aggregate with the primary cell PC2 and the secondary cell SC3 at the mobile device. When the secondary cell SC4 is on an FDD component carrier, the PUCCH timing of the secondary cell SC4 may be assigned to be the same as the PUCCH timing of the secondary cell SC3.

When the secondary cell SC4 is on a TDD component carrier, a reference TDD configuration may be determined according to a combination of TDD configurations of the TDD primary cell PC2 and the secondary cell SC4. In an example, the PUCCH timing of the secondary cell SC4 may be assigned to follow a PUCCH feedback timing of the reference TDD configuration, while the PUCCH timing of the secondary cell SC3 follows the process 50 wherein the index k belongs to the downlink association set K2 mentioned previously. In another example, the PUCCH timing of the secondary cell SC4 may be assigned to follow a PUCCH feedback timing of the reference TDD configuration, while the PUCCH timing of the secondary cell SC3 is assigned by associating the UL subframe on the TDD primary cell PC2 with at least one DL subframe on the secondary cell SC3 based on assuming the UL-DL configuration of the TDD primary cell PC2 is the reference TDD configuration.

The reference TDD configuration may be determined based on the conditions and TABLE IV as follows.

If the pair formed by (primary cell TDD configuration, second secondary cell TDD configuration) belongs to Set 1 in TABLE IV, or if the mobile device is not configured to monitor Physical Downlink Control Channel (PDCCH) or Enhanced Physical Downlink Control Channel (EPDCCH) in another serving cell for scheduling the serving cell, and if the pair formed by (primary cell TDD configuration, second secondary cell TDD configuration) belongs to Set 2 or Set 3 in TABLE IV, or if the mobile device is configured to monitor PDCCH/EPDCCH in another serving cell for scheduling the serving cell, and if the pair formed by (primary cell TDD configuration, second secondary cell TDD configuration) belongs to Set 4 or Set 5 in TABLE IV, then the reference TDD configuration for the primary cell PC2 and the secondary cell SC4 is defined in the corresponding Set in TABLE IV.

TABLE IV

| Set # | (Primary cell TDD configuration, second secondary cell TDD configuration) | reference TDD configuration |
|---|---|---|
| Set 1 | (0, 0) | 0 |
| | (1, 0), (1, 1), (1, 6) | 1 |
| | (2, 0), (2, 2), (2, 1), (2, 6) | 2 |
| | (3, 0), (3, 3), (3, 6) | 3 |
| | (4, 0), (4, 1), (4, 3), (4, 4), (4, 6) | 4 |
| | (5, 0), (5, 1), (5, 2), (5, 3), (5, 4), (5, 5), (5, 6) | 5 |
| | (6, 0), (6, 6) | 6 |
| Set 2 | (0, 1), (6, 1) | 1 |
| | (0, 2), (1, 2), (6, 2) | 2 |
| | (0, 3), (6, 3) | 3 |
| | (0, 4), (1, 4), (3, 4), (6, 4) | 4 |
| | (0, 5), (1, 5), (2, 5), (3, 5), (4, 5), (6, 5) | 5 |
| | (0, 6) | 6 |
| Set 3 | (3, 1), (1, 3) | 4 |
| | (3, 2), (4, 2), (2, 3), (2, 4) | 5 |
| Set 4 | (0, 1), (0, 2), (0, 3), (0, 4), (0, 5), (0, 6) | 0 |
| | (1, 2), (1, 4), (1, 5) | 1 |
| | (2, 5) | 2 |
| | (3, 4), (3, 5) | 3 |
| | (4, 5) | 4 |
| | (6, 1), (6, 2), (6, 3), (6, 4), (6, 5) | 6 |
| Set 5 | (1, 3) | 1 |
| | (2, 3), (2, 4) | 2 |
| | (3, 1), (3, 2) | 3 |
| | (4, 2) | 4 |

It is noted that the PUCCH timing should be known by both the mobile device and the base station to which the mobile device connects. The network may assign UL transmission timing in its base station in a manner similar or corresponded to the steps performed in the mobile device for receiving the feedback from the mobile device. As a result, the mobile device knows the resource to transmit the PUCCH and the base station knows the resource to receive the PUCCH.

It should be noted that the PUCCH transmission may happen on a cell which is not a primary cell (i.e., a secondary cell) and the proposed method can be directly reused.

A radio interface protocol of the communication system 10 may include three layers: the Physical Layer (L1), the Data Link Layer (L2), and the Network Layer (L3), wherein a control plane of L3 is a Radio Resource Control (RRC) layer, and L2 is further divided into a Packet Data Convergence Protocol (PDCP) layer, a Radio Link Control (RLC) layer and a Medium Access Control (MAC) layer.

The main services and functions of the MAC layer may include a discontinuous reception (DRX) functionality. The mobile device may be configured by the RRC layer with the DRX functionality that allows the mobile device to discontinuously monitor a Physical Downlink Control Channel (PDCCH) carrying information about resource allocation of a Downlink Shared Channel (DL-SCH) and scheduling grants. The DRX functionality is operated based on parameters such as DRX Cycle, drx-InactivityTimer, drx-RetransmissionTimer, drxShortCycleTimer, drxStartOffset, HARQ RTT Timer, and onDurationTimer, PDCCH-subframe. Among these parameters, the HARQ RTT Timer is used to specify the minimum amount of subframe(s) before a DL HARQ retransmission is expected by the mobile device. These DRX related parameters may be configured by a DRX-configuration information element (IE) of the RRC layer.

Figure 7:
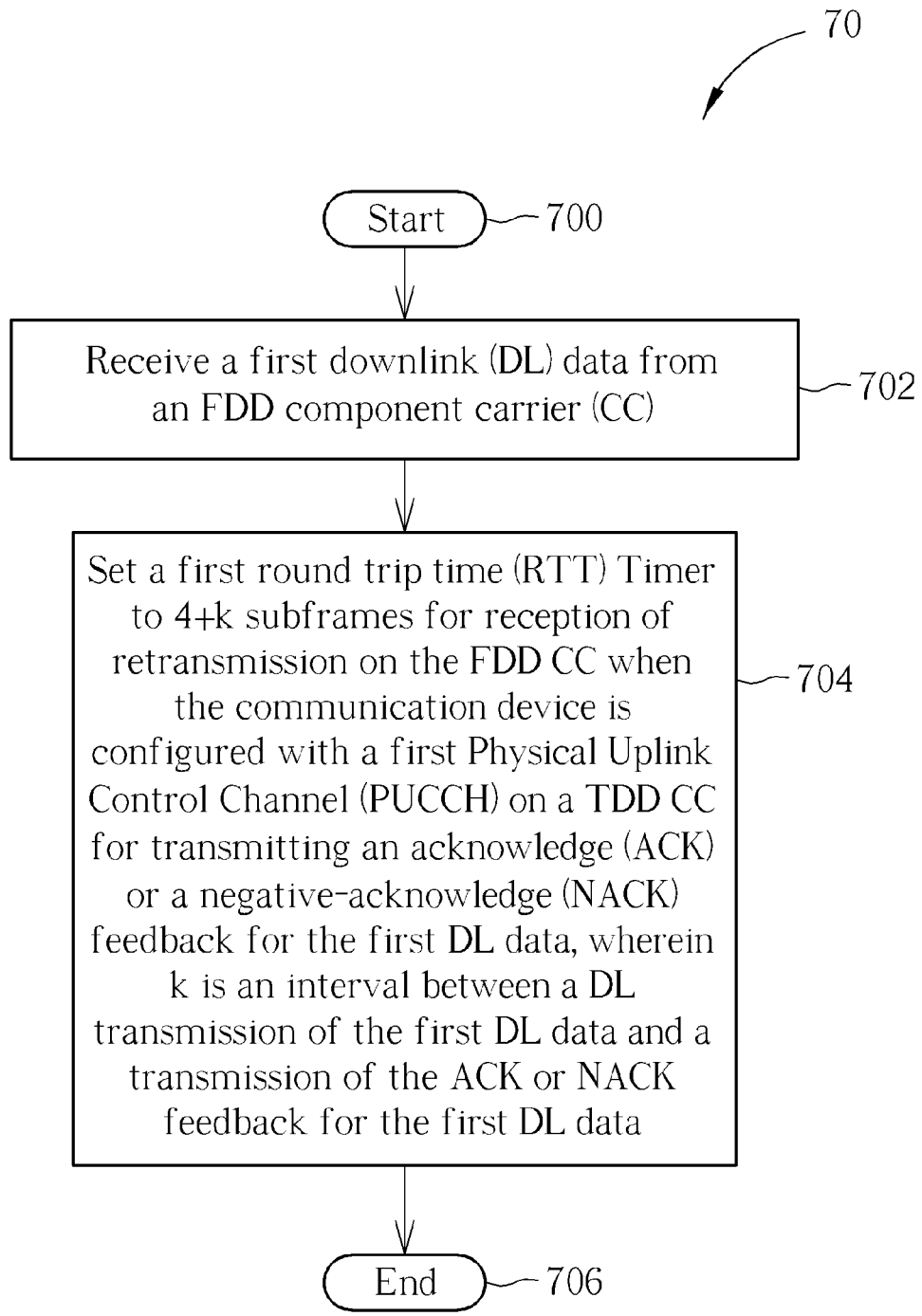
FIG. 7 is a flowchart of a process according to an example of the present invention.

Please refer to FIG. 7, which is a flowchart of a process 70 according to an example of the present invention. The process 70 is utilized for handling a HARQ RTT timer for a mobile device configured with jointly aggregated TDD and FDD component carriers (CCs). The mobile device may be the UE in the wireless communication system 10, but is not limited herein. The process 30 may be implemented by the communication device 20 and compiled into the program code 214 to instruct the processing means 200 to execute the following steps:

Step 700: Start.

Step 702: Receive a first downlink (DL) data from an FDD component carrier (CC).

Step 704: Set a first round trip time (RTT) Timer to 4+k subframes for reception of retransmission on the FDD CC when the communication device is configured with a first Physical Uplink Control Channel (PUCCH) on a TDD CC for transmitting an acknowledge (ACK) or a negative-acknowledge (NACK) feedback for the first DL data, wherein k is an interval between a DL transmission of the first DL data and a transmission of the ACK or NACK feedback for the first DL data.

Step 706: End.

According to the process 70, when the mobile device is configured with a PUCCH on the TDD CC for transmitting an ACK/NACK feedback (or a HARQ ACK/NACK feedback) for downlink data received from the FDD CC, the mobile device may apply 4+k subframes (or 4+k milliseconds) for a HARQ RTT Timer used for a downlink HARQ process for reception of retransmission on the FDD CC, wherein k is an interval between a first subframe where a downlink transmission is received and a second subframe where an uplink transmission of HARQ feedback associated to the downlink transmission for the downlink HARQ process is transmitted. The parameter k may be determined in accordance with the abovementioned downlink association set K2 (e.g., TABLE III). The downlink transmission may be a new transmission or a retransmission. The mobile device may be configured with a primary cell on the TDD CC and a secondary cell on the FDD CC, where the secondary cell and the primary cell are aggregated to transmit to the mobile device. A network configuring the TDD CC and the FDD CC to the mobile device is forbidden to transmit a DL retransmission associated to the DL transmission earlier than the 4+k subframes after a subframe where the DL transmission is transmitted. In other words, when the network receives the HARQ feedback which is a HARQ NACK or the network does not receive the HARQ feedback, the network is forbidden to transmit the DL retransmission associated to the DL transmission earlier than the 4 subframes after a subframe where the HARQ feedback is received.

Further, when the mobile device is configured with a PUCCH on the TDD CC for transmitting HARQ feedback for downlink data received from the TDD CC, the mobile device may also apply 4+k subframes (or 4+k milliseconds) for a HARQ RTT Timer used for a downlink HARQ process for reception of retransmission of the downlink data on the TDD CC, wherein k is an interval between a downlink transmission and an uplink transmission of HARQ feedback associated to the downlink transmission for the downlink HARQ process. In other words, the mobile device may receive the DL data on the TDD CC and transmit the associated HARQ feedback on the same TDD CC. Under such condition, the RTT Timer is also set to 4+k subframes for reception of retransmission on the TDD CC. The network configuring the TDD CC and the FDD CC to the mobile device is forbidden to transmit a DL retransmission associated to the DL transmission earlier than the 4+k subframes after a subframe where the DL transmission is transmitted. In other words, when the network receives the HARQ feedback which is a HARQ NACK or the network does not receive the HARQ feedback, the network is forbidden to transmit the DL retransmission associated to the DL transmission earlier than the 4 subframes after a subframe where the HARQ feedback is received.

Figure 8:
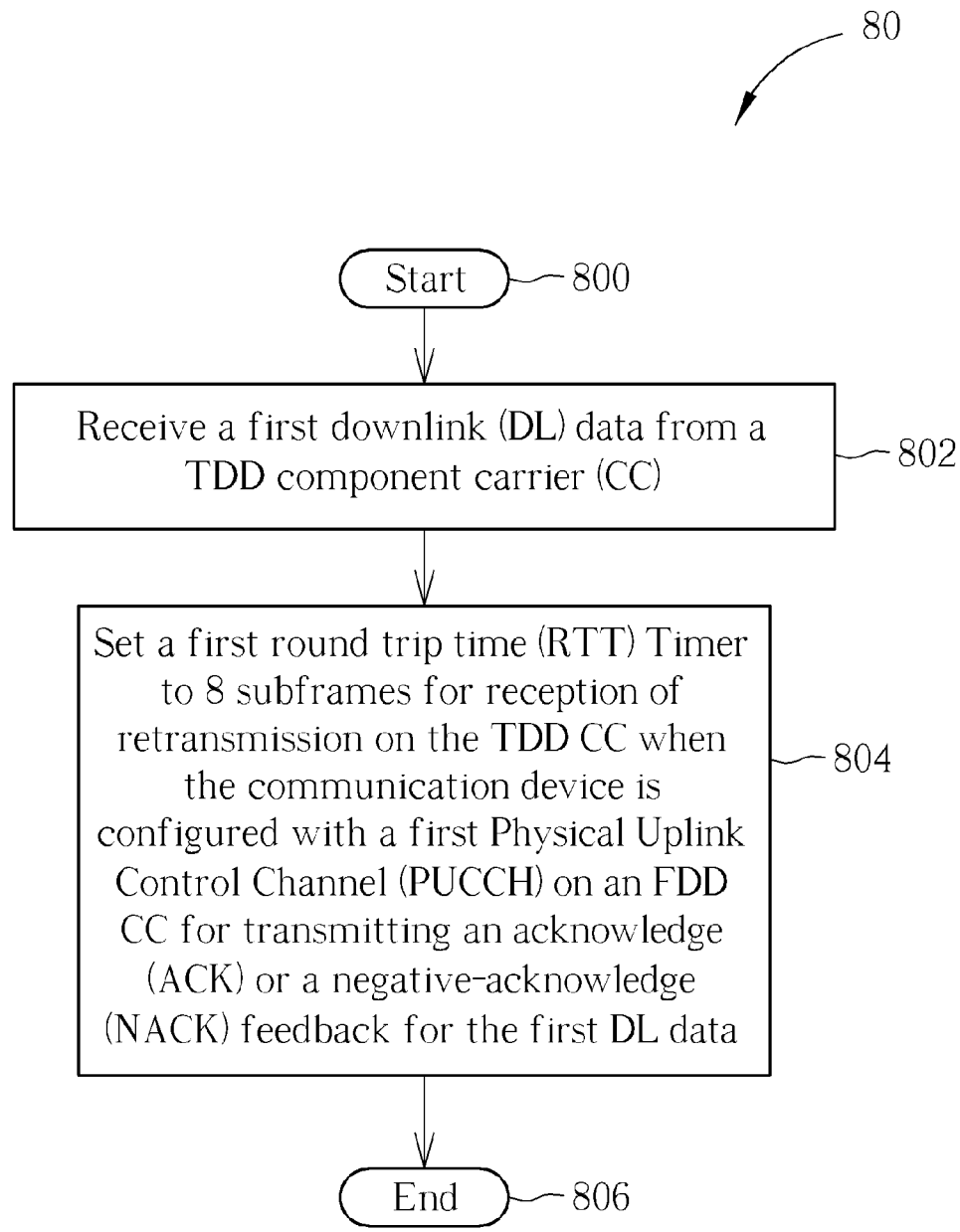
FIG. 8 is a flowchart of a process according to an example of the present invention.

Please refer to FIG. 8, which is a flowchart of a process 80 according to an example of the present invention. The process 80 is utilized for handling a HARQ RTT timer for a mobile device configured with jointly aggregated TDD and FDD component carriers (CCs). The mobile device may be the UE in the wireless communication system 10, but is not limited herein. The process 30 may be implemented by the communication device 20 and compiled into the program code 214 to instruct the processing means 200 to execute the following steps:

Step 800: Start.

Step 802: Receive a first downlink (DL) data from a TDD component carrier (CC).

Step 804: Set a first round trip time (RTT) Timer to 8 subframes for reception of retransmission on the TDD CC when the communication device is configured with a first Physical Uplink Control Channel (PUCCH) on an FDD CC for transmitting an acknowledge (ACK) or a negative-acknowledge (NACK) feedback for the first DL data.

Step 806: End.

According to the process 80, when the mobile device is configured with a PUCCH on the FDD CC for transmitting an ACK/NACK feedback (or a HARQ ACK/NACK feedback) for a DL transmission of a downlink data received from the TDD CC, the mobile device applies 8 subframes (or 8 milliseconds) for a HARQ RTT Timer used for a downlink HARQ process for reception of retransmission on the TDD CC. The downlink transmission may be a new transmission or a retransmission. The mobile device may be configured with a primary cell on the FDD CC and a secondary cell on the TDD CC, where the secondary cell and the primary cell are aggregated to transmit to the mobile device. A network configuring the TDD CC and the FDD CC to the mobile device is forbidden to transmit a DL retransmission associated to the DL transmission/retransmission earlier than the 8 subframes after a subframe where the DL transmission is transmitted. In other words, when the network receives the HARQ feedback which is a HARQ NACK or the network does not receive the HARQ feedback, the network is forbidden to transmit the DL retransmission associated to the DL transmission earlier than the 4 subframes after a subframe where the HARQ feedback is received.

Further, when the mobile device is configured with a PUCCH on the FDD CC for transmitting HARQ feedback for downlink data received from the FDD CC, the mobile device applies 8 subframes (or 8 milliseconds) for a HARQ RTT Timer used for a downlink HARQ process for reception of retransmission of the downlink data on the FDD CC. In other words, the mobile device may receive the DL data on the FDD CC and transmit the associated HARQ feedback on the same FDD CC. Under such condition, the RTT Timer is also set to 8 subframes for reception of retransmission on the FDD CC. The network configuring the TDD CC and the FDD CC to the mobile device is forbidden to transmit a DL retransmission associated to the DL transmission/retransmission earlier than the 8 subframes after a subframe where the DL transmission is transmitted. In other words, when the network receives the HARQ feedback which is a HARQ NACK or the network does not receive the HARQ feedback, the network is forbidden to transmit the DL retransmission associated to the DL transmission earlier than the 4 subframes after a subframe where the HARQ feedback is received.

Note that the above descriptions related to the process 70 and 80 illustrate examples that the PUCCH (i.e., HARQ feedback for the downlink data) is transmitted on a primary cell. In another example, the mobile device may be configured by the network with a PUCCH transmitted on the FDD CC and a PUCCH transmitted the TDD CC. In this configuration, the mobile device may set a first RTT Timer to 8 subframes for reception of retransmission of a first DL data on the FDD CC for a first DL HARQ process and set a second RTT timer to 4+k subframes for reception of retransmission of a second DL data on the TDD CC for a second DL HARQ process, wherein k is an interval between reception of the second DL data and an uplink transmission of HARQ feedback associated to the second DL data for the second DL HARQ process.

The abovementioned steps of the processes 30, 50, 70 and 80 including suggested steps may be realized by means of hardware, software, firmware, or an electronic system. Examples of hardware may include analog, digital and mixed circuits known as microcircuit, microchip, or silicon chip. Examples of the electronic system may include a system on chip (SOC), system in package (SiP), a computer on module (COM), and the communication device 20. It is noted that any of the abovementioned steps of the processes 30, 50, 70 and 80 including suggested steps may be combined by means of hardware, software, firmware, or an electronic system.

In conclusion, the present invention provides a method to assign PUCCH transmission timing when the mobile device is configured with joint operation/aggregation of FDD and TDD component carriers. In addition, when the mobile device is configured with a PUCCH on the TDD CC for transmitting HARQ feedback for downlink data received from the FDD CC, the mobile device applies 4+k subframes for a HARQ RTT Timer, where k is an interval between a DL transmission of the downlink data and the transmission of ACK/NACK feedback for the downlink data. On the other hand, when the mobile device is configured with a PUCCH on the FDD CC for transmitting HARQ feedback for downlink data received from the TDD CC, the mobile device applies 8 subframes for a HARQ RTT Timer. Hence, the mobile device can set the RTT Timer appropriately under joint TDD and FDD operation, which assures the mobile device can switch its receiver to a sleep mode for appropriate time frames in order to save battery power and wake up to receive a retransmission of the downlink data at the correct moment.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for assigning transmission timing of Physical Uplink Control Channel (PUCCH) configured with jointly aggregated Time Division Duplex (TDD) and Frequency Division Duplex (FDD) component carriers, comprising: a processing means; and a storage unit, coupled to the processing means, for storing a program code, wherein the program code instructs the processing means to execute the steps of: receiving a first downlink (DL) transmission in a second subframe on a first cell;

determining a first uplink (UL) transmission timing in a first subframe for a corresponding feedback in response to the first DL transmission in the second subframe on the first cell, where the second subframe is k subframes prior to the first subframe; and transmitting the corresponding feedback of the first DL transmission in the first subframe on a second cell according to the first UL transmission timing; wherein the first cell is on a TDD component carrier and the first cell has no PUCCH to transmit the corresponding feedback of the first DL transmission; wherein the second cell is on an FDD component carrier and the second cell uses PUCCH to transmit the corresponding feedback of the first DL transmission of the first cell; wherein is constant over all subframe numbers; and wherein the program code further instructs steps of: setting a Hybrid Automatic Repeat Request (HARQ) round trip time (RTT) Timer to 8 subframes for reception of retransmission of the first DL transmission on the first cell.

2. The communication device of claim 1, wherein k belongs to a downlink association set depending on the subframe number of the first subframe on the second cell and the UL-DL configuration of the first cell.

3. The communication device of claim 1, wherein the corresponding feedback is a Hybrid Automatic Repeat Request (HARQ) feedback corresponding to the first DL transmission in the second subframe of the first cell.

4. The communication device of claim 1, wherein the program code further instructs the processing means to execute steps of receiving a second DL transmission on a third cell; and determining a second UL transmission timing of second DL transmission of the third cell independently, irrespective of the first UL transmission timing of the first DL transmission of the first cell; wherein the third cell is a TDD component carrier and has different TDD configuration than the first cell.

5. The communication device of claim 1, wherein the program code further instructs the processing means to execute steps of: determining a reference TDD configuration according to a combination of TDD configurations of the first cell and the third cell; and determining a second UL transmission timing in a second subframe of the first DL transmission of the first cell as the first UL transmission timing in the first subframe of the first cell, wherein k belongs to a downlink association set depending on the subframe number of the second subframe and the determined reference TDD configuration; and determining a third UL transmission timing in a third subframe of the second DL transmission of the third cell, wherein k belongs to the downlink association set depending on the subframe number of the third subframe and the determined reference TDD configuration.

6. A communication device for assigning transmission timing of Physical Uplink Control Channel (PUCCH) configured with jointly aggregated Time Division Duplex (TDD) and Frequency Division Duplex (FDD) component carriers, comprising:

a processing means; and a storage unit, coupled to the processing means, for storing a program code, wherein the program code instructs the processing means to execute steps of: receiving a first downlink (DL) transmission on a first cell; determining a first uplink (UL) transmission timing of the first cell by associating a UL subframe on a second cell with at least one DL subframe on the first cell, wherein every DL subframe on the first cell is associated to one UL subframe on the second cell, and wherein the at least one DL subframe is k subframes prior to the UL subframe; and transmitting a corresponding feedback of the first DL transmission in the associated UL subframe on the second cell; wherein the first cell is on an FDD component carrier and the first cell has no PUCCH to transmit the corresponding feedback of the first DL transmission; and wherein the second cell is on a TDD component carrier and the second cell uses PUCCH to transmit the corresponding feedback of the first DL transmission of the first cell; wherein k falls between 4 and 6 when the second cell is configured with UL-DL Configuration 0, k falls between 4 and 7 when the second cell is configured with UL-DL Configuration 1, k falls between 4 and 8 when the second cell is configured with UL-DL Configuration 2, k falls between 4 and 11 when the second cell is configured with UL-DL Configuration 3, k falls between 4 and 12 when the second cell is configured with UL-DL Configuration 4, k falls between 4 and 13 when the second cell is configured with UL-DL Configuration 5, and k fails between 4 and 7 when the second cell is configured with UL-DL Configuration 6.

7. The communication device of claim 6, wherein k belongs to a downlink association set depending on the subframe number of the UL subframe and the UL-DL configuration of the second cell.

8. The communication device of claim 6, wherein k is 4, 5, 6, 7, or 8 for the UL subframe in subframe 2 and k is 4, 5, 6, 7, or 8 for the UL subframe in subframe 7 if the second cell is configured with UL-DL Configuration 2.

9. The communication device of claim 6, wherein k is 6, 7, 8, 9, 10, or 11 for the UL subframe in subframe 2, k is 5 or 6 for the UL subframe in subframe 3 and k is 4 or 5 for the UL subframe in subframe 4 if the second cell is configured with UL-DL Configuration 3.

10. The communication device of claim 6, wherein k is 7, 8, 9, 10, 11, or 12 for the UL subframe in subframe 2 and k is 4, 5, 6, or 7 for the UL subframe in subframe 3 if the second cell is configured with UL-DL Configuration 4.

11. The communication device of claim 6, wherein k is 4, 5, 6, 7, 8, 9, 10, 11, 12, or 13 for the UL subframe in subframe 2 if the second cell is configured with UL-DL Configuration 5.

12. The communication device of claim 6, wherein the corresponding feedback is a Hybrid Automatic Repeat Request (HARQ) feedback corresponding to the first DL transmission in the at least one DL subframe.

13. The communication device of claim 6, wherein the program code further instructs the processing means to execute the following steps:
- receiving a second DL transmission in a third cell, wherein the third cell is on a TDD component carrier;
- determining a reference TDD configuration according to a combination of TDD configurations of the second cell and the third cell; and
- determining a second UL transmission timing of the second DL transmission of the third cell which follows a PUCCH feedback timing of the reference TDD configuration.

14. The communication device of claim 6, wherein the program code further instructs the processing means to execute the following steps:
- determining a reference TDD configuration according to a combination of TDD configurations of the second cell and the third cell; and
- determining a third UL transmission timing of the first DL transmission of the first cell as the first UL transmission timing of the first DL transmission of the first cell which follows a PUCCH feedback timing of the reference TDD configuration;
- wherein the UL subframe on the second cell is associated with the at least one DL subframe on the first cell based on assuming the UL-DL configuration of the second cell is the reference TDD configuration.

15. The communication device of claim 6, wherein the program code further instructs the processing means to execute steps of: setting a Hybrid Automatic Repeat Request (HARQ) round trip time (RTT) Timer to 4+k subframes for reception of retransmission on the first cell.

16. A communication device configured with jointly aggregated Time Division Duplex (TDD) and Frequency Division Duplex (FDD) component carriers, comprising: a processing means; and a storage unit, coupled to the processing means, for storing a program code, wherein the program code instructs the processing means to execute steps of: receiving a first downlink (DL) data from an first component carrier (CC); and setting a first round trip time (RTT) Timer to a period for reception of retransmission on the first CC when the communication device is configured with a first Physical Uplink Control Channel (PUCCH) on a second CC for transmitting an acknowledge (ACK) or a negative-acknowledge (NACK) feedback for the first DL data; when the first CC is an FDD CC and the second CC is a TDD CC, the period equals to 4+k subframes, wherein k is an interval between a DL transmission of the first DL data and a transmission of the ACK or NACK feedback for the first DL data; when the first CC is a TDD CC and the second CC is an FDD CC, the period equals to 8 subframes.

17. The communication device of claim 16, wherein k is 4, 5, 6, 7, or 8 for a UL subframe in subframe 2 and k is 4, 5, 6, 7, or 8 for a UL subframe in subframe 7 if the first CC is configured with UL-DL Configuration 2; wherein k is 6, 7, 8, 9, 10, or 11 for a UL subframe in subframe 2, k is 5 or 6 for a UL subframe in subframe 3 and k is 4 or 5 for a UL subframe in subframe 4 if the first CC is configured with UL-DL Configuration 3; wherein k is 7, 8, 9, 10, 11, or 12 for a UL subframe in subframe 2 and k is 4, 5, 6, or 7 for a UL subframe in subframe 3 if the first CC is configured with UL-DL Configuration 4; wherein k is 4, 5, 6, 7, 8, 9, 10, 11, 12, or 13 for a UL subframe in subframe 2 if the first CC is configured with UL-DL Configuration 5.

\* \* \* \* \*